(No Model.) 3 Sheets—Sheet 1.

R. W. WHITNEY.
CASH REGISTER.

No. 473,719. Patented Apr. 26, 1892.

Witnesses,

Inventor,
Ruel W. Whitney
By Dewey & Co
Attys (No Model.) 3 Sheets—Sheet 2.
R. W. WHITNEY.
CASH REGISTER.

No. 473,719. Patented Apr. 26, 1892.

Witnesses:
J. H. Srouse
H. C. Lee.

Inventor,
Ruel W. Whitney
By Dewey & Co.
Attys

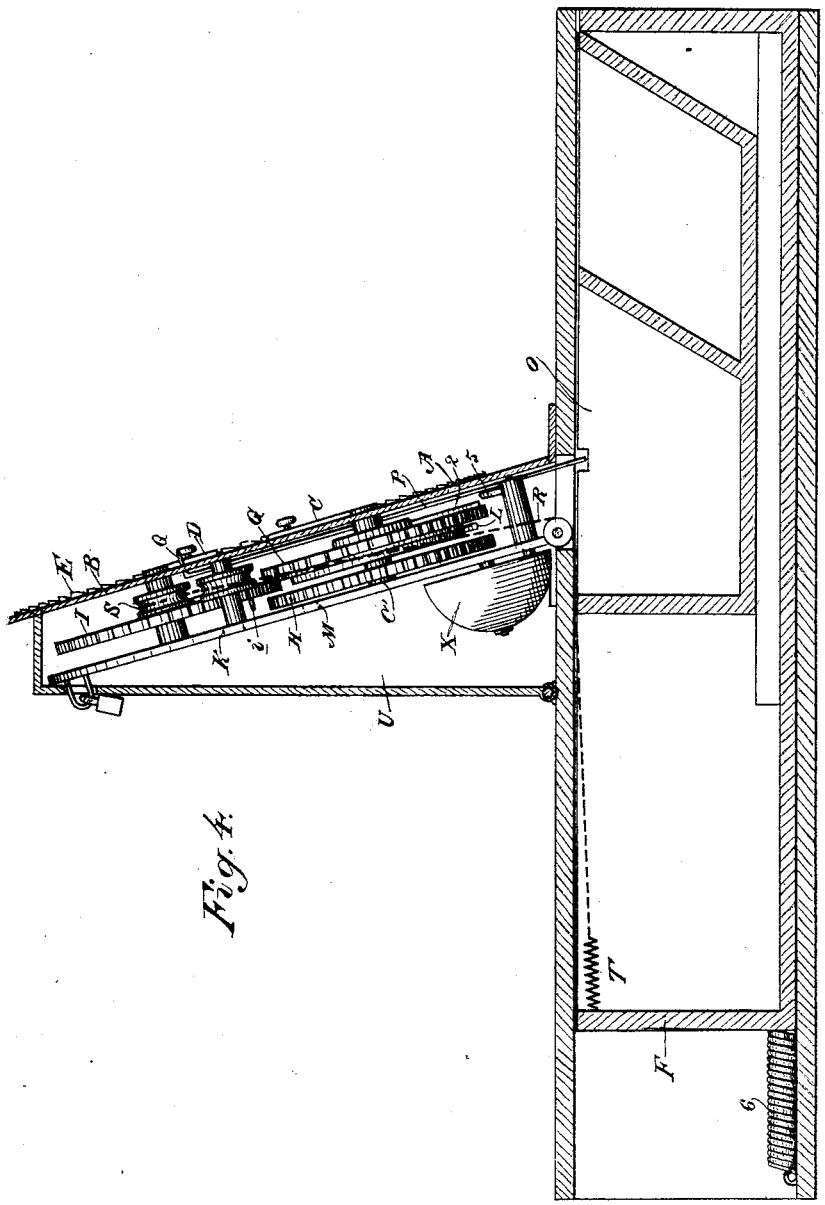

UNITED STATES PATENT OFFICE.

RUEL W. WHITNEY, OF SAN FRANCISCO, CALIFORNIA.

CASH-REGISTER.

SPECIFICATION forming part of Letters Patent No. 473,719, dated April 26, 1892.

Application filed July 18, 1890. Serial No. 359,222. (No model.)

*To all whom it may concern:*

Be it known that I, RUEL W. WHITNEY, a citizen of the United States, residing in the city and county of San Francisco, State of California, have invented an Improvement in Cash-Registers; and I hereby declare the following to be a full, clear, and exact description of the same.

My invention relates to an improvement in that class of devices known as "cash-registers" and employed for the purpose of keeping an account of all amounts which are received, and in connection therewith of a money-drawer, which is operated so as to be opened by the operation of the register.

It also consists in certain details of construction, which will be more fully explained by reference to the accompanying drawings, in which—

Figure 1:
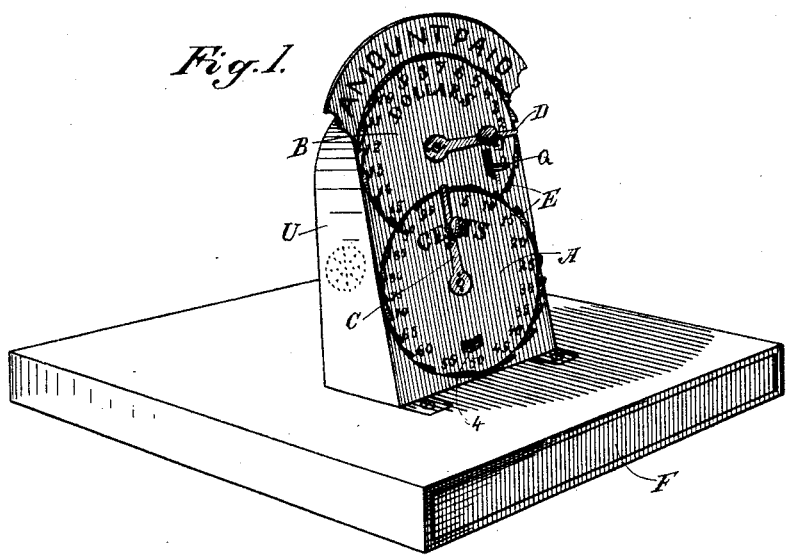
Figure 2:
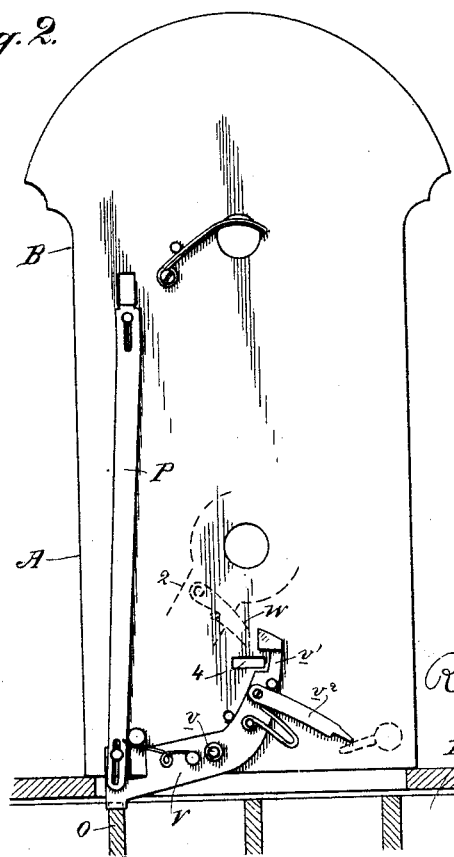
Figure 3:
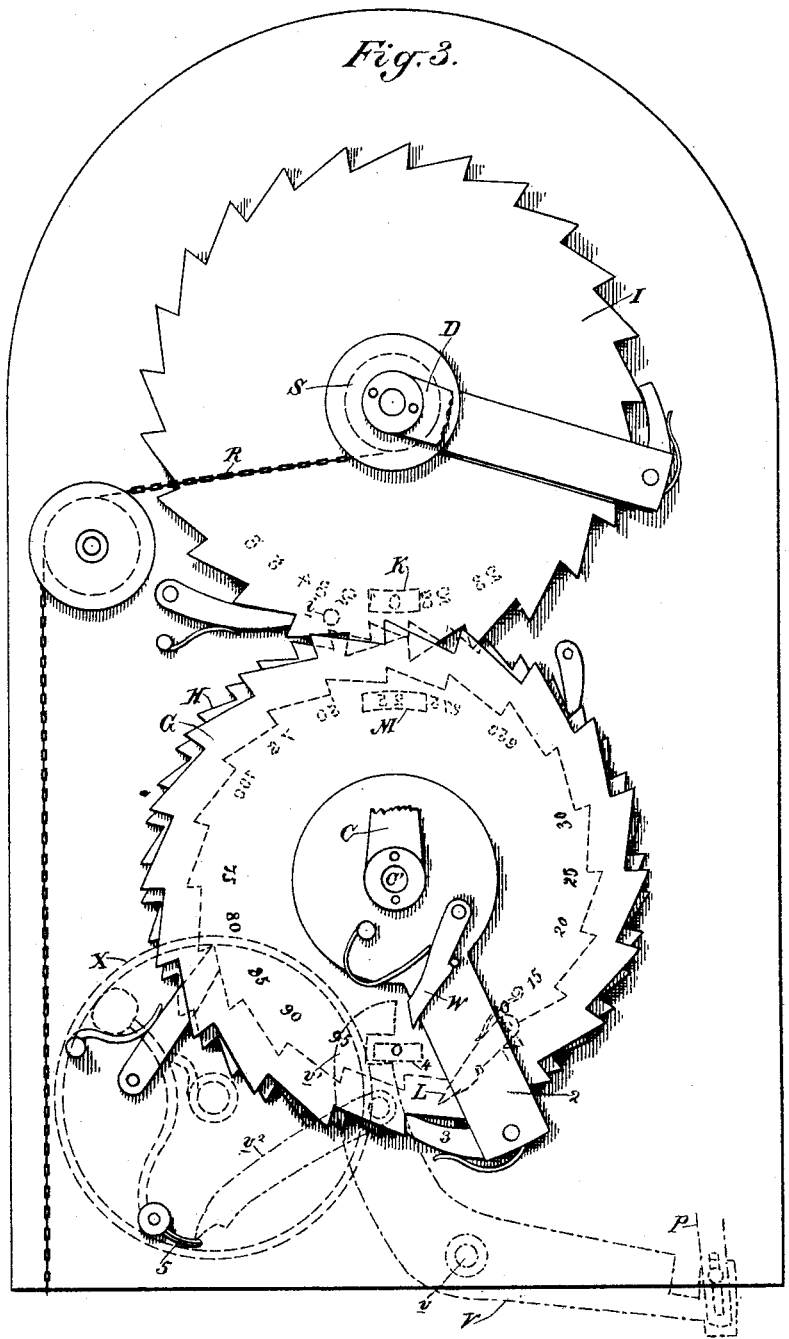

Figure 1 is an exterior view of my device. Fig. 2 shows the dial-plate reversed. Fig. 3 is a view with the dials removed, showing the interior mechanism. Fig. 4 is a section taken longitudinally and vertically through the drawer, showing the position of the mechanism by which the register is operated.

A and B are two dials arranged upon a plate one above the other. The lower dial forms a complete circle and is marked from "zero" to "95" in graduations increasing by five, as "5, 10, 15," &c., and these indicate the number of cents from five to one hundred. Over this dial a pointer or index-finger C is adapted to move, the inner end of the finger being mounted upon a shaft which passes centrally through the dial and connects with the rear plate. The dial B is in the form of a segment or crescent and fits over the top of the dial A, as shown, so that the hole through the center of this dial is very near the top of the dial A. The index finger or pointer D turns about a central spindle or shaft and over the face of the upper disk and may be moved around in the circle of the dial in the same manner as described for the index of the dial A.

The periphery of the dial B is divided into any suitable number of figures, as from "1" to "15," and these may indicate dollars. If any number of dollars is received, it is indicated by moving the index or pointer upon the upper dial to the figure indicating the number of dollars, and if any number of cents is received it is similarly indicated by moving the pointer upon the lower dial to the figure representing the number of cents. At the same time that this movement takes place a cash-drawer F, which is situated below the register, is released by a connecting mechanism, so as to be opened and expose the receptacles for the money which is to be deposited. Around the periphery of each of the dials and outside of the circle of figures is a raised rim E, having notches or stops made in it opposite each of the figures, so as to insure the stopping of the index-pointer exactly when it is moved to the desired point. After each forward movement of either of the pointers they may be returned to zero again ready for a new movement. The shaft C' of the pointer C passes, as before described, through the center of the dial A, and within the interior of the case it carries two ratchet wheels or disks G and H, which turn independently of each other about the shaft. The pointer C is fixed to a hub having an arm 2, which carries a spring-actuated pawl 3, and this pawl engages the teeth of the forward ratchet-disk, so that when the pointer is moved by means of the knob or thumb-piece upon it it will turn this disk. Upon the face of this disk are marked figures corresponding with those upon the dial, and a hole 4 is made through the dial sufficiently distant from the center, so that these figures are exposed and may be seen through this hole as the ratchet-disk is turned around.

1 is a similar ratchet-disk turning upon a shaft in the center of the upper dial B and having a pawl carried by the index-pointer D engaging it, so that when the pointer is moved this ratchet will also be moved. Any number of dollars may thus be indicated by the rotation of this ratchet-disk up to a certain number, and these numbers are exposed successively through the back of the case containing the disk and mechanism by means of a slot or opening K made through the back, so as to correspond with the figures on the dial. When the number of cents indicated by the lower dial amount to more than a dollar, which happens as soon as the lower ratchet has completed a single revolution, a pawl L, which is carried by the lower disk, engages with a tooth of the upper ratchet, which carries the dollar-figures, and moves it forward one tooth, thus adding a dollar to those exhibited upon this disk. When the upper disk has made a complete revolution, a pawl or pin $i$ upon this disk engages a tooth of a third ratchet-wheel H, which is journaled upon the lower shaft and behind the first ratchet-disk, as before stated, and this advances it one tooth. This lower ratchet-disk has figures made upon it, which are exposed through an opening M in the rear plate, and these figures represent the sum which is indicated by the upper disk and automatically adds them, so that the two disks combined show at all times the amount in dollars which has been received. Suitable pawls engage the teeth of these various disks and prevent their being moved backwardly when the pointers are returned to their original positions. The drawer has a notched or perforated plate O extending along the top, and a vertically-moving bar P has its lower end adapted to engage the hole or notch and thus retain the drawer when it is closed.

In order to open the drawer when the upper pointer D of the dollar-dial is moved, a projecting arm Q, attached to the upper end of the bar P and extending through a slot in the upper dial B, is seized simultaneously with the pointer and is moved upward the length of the slot. This draws the bar P upward out of the plate O and releases the drawer, which is then opened. If the pointer is to be moved around still farther, the arm Q is released by the fingers, while the pointer is moved onto the desired number of figures, as indicated in the dial. When the drawer is closed, the pointer will be returned to its normal position by means of a chain or flexible band R, which passes round a small pulley S, fixed to the hub of the pointer D, thence down through a hole in the top of the table beneath which the drawer slides, and thence to a point where it is connected with the drawer, so that when the drawer is pushed in it will act upon the chain and, unwinding it from the pulley, will turn the pointer or hand back to its starting-point. A spring T is preferably connected with the chain or band and between it and the attachment to the drawer, so that a certain elasticity is given to it, and at the same time the action of the spring will help to throw the drawer out when it is released.

Upon the back of the rear plate of the apparatus is fixed a bell or gong X, and by means of a suitable arm 5 the hammer of this gong is drawn back and released whenever either of the pointers is moved forward to indicate the smallest amount which can be shown upon either dial, the stroke of the bell showing that the device has registered this amount.

In order to open the drawer and sound the gong when the lower pointer is moved over its dial, I have shown the following mechanism: Connected with the bottom of bar P is a lever V, pivoted at $v$ to the back of the dial-plate. The upwardly-projecting part $v'$ of the lever is adapted to be engaged by a movable contact-piece W on the hub of pointer C on its forward movement. This engagement causes the part $v'$ to be pressed down, while the lower part rises and through its connection with bar P raises said bar out of engagement with the drawer and unlocks it. The piece W on its return yields to the lever-point $v'$. Said part has also pivoted to it an arm $v^2$, which when the lever V is depressed will cause the gong-arm 5 to turn and when released to strike the gong X. By this arrangement the pointer C will at its forward movement cause the simultaneous unlocking of the drawer. A spring 6 is compressed in the space behind the drawer, and when the drawer is released this spring acts to force it outward and open.

U is a hinged case of such shape that when it is closed up against the back of the register it incloses and covers all the mechanism and all the openings at the back through which the amounts which have been deposited during any period can be read off. This inclosing case is hinged to the same table that the register stands upon, and when closed up it is secured by means of any suitable lock, so that it cannot be opened except by the person having the key of this lock. Whenever it is desired to inspect the register to know how much money has been taken, it is only necessary to unlock this device or case and turn it back upon its hinges, thus leaving the register and indicators exposed.

Having thus described my invention, what I claim as new, and desire to secure by Letters Patent, is—

1. In a cash-register, dials fixed one above the other, shafts extending through their centers, a single ratchet-disk turning loosely upon the upper shaft, two ratchet-disks turning upon the lower shaft and overlapping the lower edge of the upper disk, one in front and one behind, a pawl upon the lower front disk which engages and moves the upper disk one tooth at each revolution of the lower disk, a pawl upon the upper disk which engages and moves the rear lower disk one tooth at each revolution of the upper disk, figures marked upon the peripheries of the disks, and openings in the front and rear faces of the case, through which the figures appear, hubs or sleeves upon the two shafts, with pointers fixed to their outer ends and movable over the dial-faces, and arms fixed to their inner ends, with pawls which engage the upper and the lower front ratchet-disks, respectively, whereby the disks may be advanced independently or collectively to indicate the amounts and sums over which the pointers are moved upon the dials, substantially as herein described.

2. The dials having figures marked thereon, pointers movable about central shafts and carrying ratchet-disks having figures marked upon them, openings in the case, through which one of said figures or amounts may be seen at one time, a pulley connected with one of the ratchet-disks and movable with it, and a chain passing around said pulley, extending down through the table, and connected with the drawer, so that when the drawer is closed the chain will act upon the pulley and ratchet-disk and return the latter and the pointer to its starting position, substantially as herein described.

3. In a cash-register, dials fixed one above the other, shafts extending through their centers, a single ratchet-disk turning upon the upper shaft, two ratchet-disks turning upon the lower shaft and overlapping the lower edge of the upper disk, pointers fixed to the hubs upon the shafts and movable over the dials, pawls carried by arms fixed to the hubs, engaging and moving the upper and the lower ratchet-disks, respectively and independently, a horizontally-sliding drawer in the table beneath the indicating mechanism, a vertically-reciprocating bolt engaging and locking the drawer when in its closed position, a lever-arm V, fulcrumed in the lower part of the case and connected with the locking-bolt, a contact-piece W, carried by the hub of the lower pointer to engage and move the lever and the bolt, with an arm projecting through a slot in the dial-face by the side of the knob of the upper pointer, whereby the two may be seized simultaneously and the drawer unlocked before the upper pointer is moved and independently of the connections with the lower one, substantially as herein described.

4. In a cash-register, the superposed dials with independent pointers movable over their faces, shafts extending through the centers of the dials, ratchet-disks turning upon these shafts, hubs to which the pointers are attached also turning upon the shafts, pawls carried by the hubs and engaging the ratchet-disks, whereby the latter are rotated independently or collectively by the movements of the pointers, a spring-actuated horizontally-sliding drawer in the table beneath the dial mechanism, a vertically-sliding bolt engaging and locking the drawer in its normal and closed position, an arm extending from the bolt through a slot in the face of the upper dial by the side of the knob of its pointer, whereby the two may be seized simultaneously and the drawer released before the pointer is moved, a lever V, fulcrumed in the lower part of the case and connected with the bolt, a contact-piece W, carried by the hub of the lower pointer to move the lever and retract the bolt when the lower pointer is moved, a gong and striking-hammer, and an arm $v^3$, carried by the lever V and actuating the gong-hammer when the lever is moved or the bolt withdrawn, substantially as herein described.

In witness whereof I have hereunto set my hand.

RUEL W. WHITNEY.

Witnesses:
S. H. NOURSE,
H. C. LEE.